United States Patent
Dyck et al.

(10) Patent No.: US 7,668,545 B2
(45) Date of Patent: Feb. 23, 2010

(54) MAINTAINING DATA CONNECTIVITY FOR HANDOFFS BETWEEN COMPRESSION-ENABLED AND COMPRESSION-DISABLED COMMUNICATION SYSTEMS

(75) Inventors: Jeffrey Alan Dyck, San Diego, CA (US); Marcello Lioy, San Diego, CA (US); Paul McAllister, Jamul, CA (US)

(73) Assignee: Qualcomm Incorporated, San Diego, CA (US)

( * ) Notice: Subject to any disclaimer, the term of this patent is extended or adjusted under 35 U.S.C. 154(b) by 852 days.

(21) Appl. No.: 10/956,546

(22) Filed: Oct. 1, 2004

(65) Prior Publication Data

US 2005/0107084 A1    May 19, 2005

Related U.S. Application Data

(60) Provisional application No. 60/508,385, filed on Oct. 3, 2003.

(51) Int. Cl.
*H04W 36/00* (2009.01)
*H04W 4/00* (2009.01)
*H04L 12/56* (2006.01)

(52) U.S. Cl. .................. 455/436; 455/439; 370/389; 370/329; 370/331

(58) Field of Classification Search .............. 370/389, 370/329, 331; 455/436, 439
See application file for complete search history.

(56) References Cited

U.S. PATENT DOCUMENTS

| | | | |
|---|---|---|---|
| 6,111,866 A * | 8/2000 | Kweon et al. ............... | 370/335 |
| 6,542,992 B1 * | 4/2003 | Peirce et al. ................ | 713/153 |
| 6,590,905 B1 * | 7/2003 | Suumaki et al. ............. | 370/466 |
| 6,651,105 B1 * | 11/2003 | Bhagwat et al. ............. | 709/239 |
| 6,950,862 B1 * | 9/2005 | Puthiyandyil et al. ....... | 709/220 |
| 7,257,116 B2 * | 8/2007 | Poeluev et al. .............. | 370/389 |
| 7,346,025 B2 * | 3/2008 | Bryson ....................... | 370/328 |
| 2002/0114343 A1 | 8/2002 | Lioy et al. | |
| 2002/0141391 A1 | 10/2002 | Hsu | |
| 2003/0235168 A1 | 12/2003 | Sharma et al. | |
| 2004/0120357 A1 * | 6/2004 | Kekki .......................... | 370/521 |

* cited by examiner

*Primary Examiner*—Matthew D Anderson
*Assistant Examiner*—Wen W Huang
(74) *Attorney, Agent, or Firm*—Kyong Macek; Kristine U. Ekwueme

(57) ABSTRACT

Methods and apparatus are presented for enabling data connectivity when a handoff occurs between one communication network and another communication network, wherein the communication networks belong to different air interface standards. The mobile station triggers a Compression Control Protocol (CCP) request message to a tethered device if the mobile station determines that a new PDSN is not enabled to perform the CCP protocol. The tethered device then responds with a CCP request message with or without new negotiation parameters. The mobile station forwards the CCP request message to the new PDSN. Since the new PDSN is not enabled with CCP, the new PDSN responds with a CCP rejection message. The rejection message is passed from the mobile station back to the tethered device. The tethered device then sends uncompressed data packets to the PDSN.

36 Claims, 3 Drawing Sheets

SIMPLE 1x + 1xEVDO NETWORK

Figure 1:
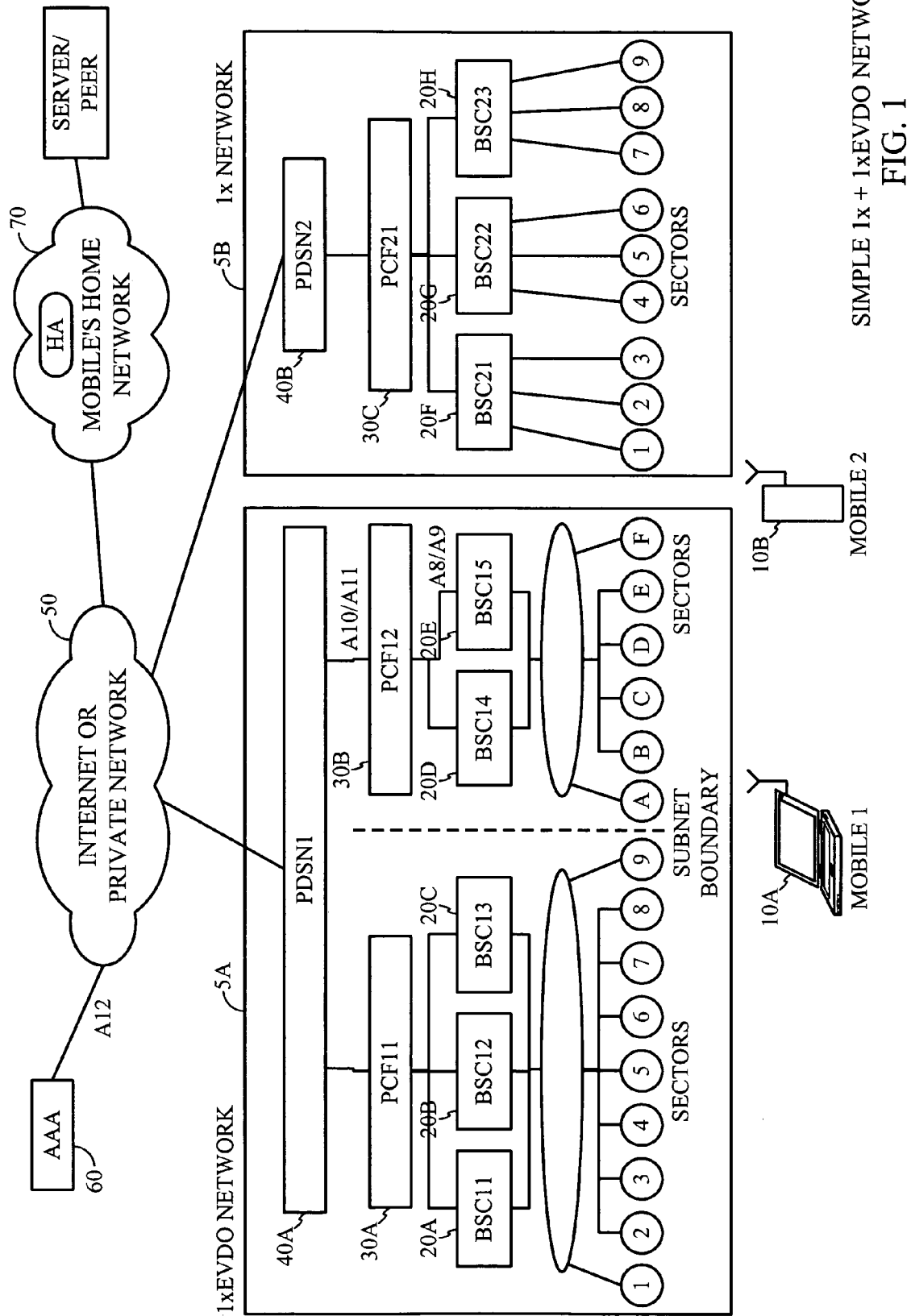

MAINTAINING DATA CONNECTIVITY FOR HANDOFFS BETWEEN COMPRESSION-ENABLED AND COMPRESSION-DISABLED COMMUNICATION SYSTEMS

CLAIM OF PRIORITY UNDER 35 U.S.C. §119

The present Application for Patent claims priority to Provisional Application No. 60/508,385 entitled "Maintaining Data Connectivity for Handoffs Between Different Communication" filed Oct. 3, 2003, and assigned to the assignee hereof and hereby expressly incorporated by reference herein.

BACKGROUND

1. Field

The present invention relates generally to communications, and more specifically, to the transmission of packetized data over wireless communication systems.

2. Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. As used herein, the term "cellular" system encompasses both cellular and personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is presented in IS-2000 and IS-856 (cdma2000 1xEV-DO). The cdma2000 1xEV-DO standard is based on a data communication system disclosed in co-pending application Ser. No. 08/963,386, entitled "METHOD AND APPARATUS FOR HIGH RATE PACKET DATA TRANSMISSION," filed on Nov. 3, 1997, which is assigned to the assignee of the present invention and incorporated by reference herein. The cdma2000 1xEV-DO communication system defines a set of data rates at which an access point (AP) may send data to a subscriber station (access terminal, AT). Because the AP is analogous to a base station, the terminology with respect to cells and sectors is the same as with respect to voice systems. Yet another CDMA standard is the W-CDMA standard, as embodied in 3rd Generation Partnership Project "3GPP", Document Nos. 3G TS 25.211, 3G TS 25.212, 3G TS 25.213, and 3G TS 25.214.

Given the growing demand for wireless data applications, the need for very efficient wireless data communication systems has become increasingly significant. One such wireless data application is the transmission of data packets that originate or terminate at packet-switching networks. Various protocols exist for transmitting packetized traffic over packet-switching networks so that information arrives at its intended destination. One such protocol is "The Internet Protocol," Request for Comment (RFC) 791 (September, 1981). The internet protocol (IP) breaks up messages into packets, routes the packets from a sender to a destination, and reassembles the packets into the original messages at the destination. The IP protocol requires that each data packet begins with an IP header containing source and destination address fields that uniquely identifies host and destination computers. Another protocol is the Point-to-Point Protocol (PPP), promulgated in RFC 1661 (July 1994), which is an encapsulation protocol for transporting IP traffic over point-to-point links. Yet another protocol is the IP Mobility Support, promulgated in RFC 2002 (October 1996), which is a protocol that provides for transparent routing of IP datagrams to mobile nodes.

Hence, the transmission of data packets from the IP network over a wireless communication network or from the wireless communication network over the IP network can be accomplished by adherence to a set of protocols, referred to as a protocol stack. A wireless communication device may be the origination or the destination of the IP packet, or alternatively, the wireless communication device may be a transparent link to a tethered electronic device. In either case, payload information is broken into packets wherein header information is added to each packet. Each protocol layer sequentially adds its own header information to each packet. The IP layer sits on top of the PPP layer, which sits on the RLP layer, which sits on top of the physical layer. The RLP layer is the Radio Link Protocol layer, which is responsible for retransmitting packets when a transmission error occurs. The packets are transported over the air to a packet data service node (PDSN) via an Access Network (AN), whereupon the packet is subsequently sent over the IP network. Alternatively, IP packets are transmitted over the IP network to a PDSN, from a PDSN to an AN, and then over-the-air to a wireless communication device. The wireless communication device is also referred to as an Access Terminal (AT) herein.

Various problems arise due to the mobility of wireless communication devices. Some of these problems arise when a mobile wireless communication device moves from the support of one communication system to the support of another communication system. For example, it is currently envisioned that a mobile wireless communication device may be designed to move from the support of a cdma2000 1xRTT system to a cdma2000 1xEV-DO system or vice versa. The interoperability of a device that may support both air interface standards is currently the subject of a proposed standard known as TIA/EIA/IS-878, which is entitled, "Inter-Operability Specification (IOS) for High Rate Packet Data (HRPD) Network Access Interfaces." However, this vision of ubiquitous mobility within CDMA standards is relatively recent, and mobility amongst CDMA and other air interface standards (GPRS, UMTS, etc.) has yet to be specified. When the IS-2000, IS-856, and IS-878 standards were originally created, inter-operability in the presence of certain optional and/or tangential PPP options and network control protocols (NCPs), such as the connection control protocol (CCP), were not considered. Hence, various manufacturers and system operators are currently in the predicament of being unable to support PPP sessions across different CDMA standards because the different standards allow for different options. For instance, a cdma2000 1xEV-DO system may permit data to be compressed according to the Compression Control Protocol (CCP) during a PPP session. However, an adjacent cdma2000 1xRTT may be configured to disallow the negotiation of CCP. Hence, if the tethered device connected via the mobile station has negotiated CCP and is transmitted compressed packets, then performs a handoff from said 1xEV-DO system to said 1xRTT system, the 1xRTT system will not be able to decompress the compressed data packets from the mobile station and hence, will discard the compressed data packets. One possible solution is to force a PPP resynchronization between the mobile station and the tethered device, in order to reestablish the framing parameters. However, this solution is problematic when the mobile station is attached to a tethered device whose programming will not permit PPP resynchronizations, such as Microsoft Windows™ 2000 and earlier. Furthermore, such full resynchronization requires renegotiation of LCP, reauthentication, and all desired NCPs. Resynchronization of all such protocols is suboptimal in that it introduces unnecessary delay in the data connectivity and may potentially interrupt higher-level protocol sessions (e.g. TCP connections). There is a present need to address this concern.

SUMMARY

Optimized methods and apparatus are presented herein to enable mobile station packet mobility with a tethered device in a CDMA 2000 IP network with a mixture of CCP-enabled and non-CCP-enabled PDSNs.

In one aspect, a method is presented for enabling data connectivity when a handoff occurs between one communication network and another communication network, wherein the communication networks belong to different air interface standards. The method is implemented when a Compression Control Protocol (CCP) session is active and a mobile station has been handed off to another Packet Data Serving Node (PDSN). The method comprises having the mobile station send a CCP request message to a tethered device if the mobile station determines that the new PDSN is not enabled to perform the CCP protocol. The tethered device then responds with a CCP request message with or without new negotiation parameters. The mobile station forwards the CCP request message to the new PDSN.

In one embodiment, wherein the target PDSN is non-CCP enabled, the new PDSN responds with a CCP rejection message. The rejection message is passed from the mobile station back to the tethered device. The tethered device then sends uncompressed data packets to the PDSN.

In another embodiment, wherein the target PDSN is CCP enabled, the new PDSN responds with a CCP acknowledgement or CCP not-acknowledgement message. The returned message is passed from the mobile station back to the tethered device. The tethered device then renegotiates both compression options and resets it compression state, thereby minimizing interruption data loss due to out-of-sync compression state.

DETAILED DESCRIPTION

Because the embodiments are directed towards mobile IP telephony, the terminology of RFC 2002 will also be used forthwith. The protocol promulgated in this document enables a mobile, wireless communication device to change the point of attachment to the Internet without having to change the IP address of the device. Namely, RFC 2002 describes a registration scheme that informs a home agent of the location of a wireless communication device so that the home agent can route data packets through foreign agents. A "home agent" is the infrastructure element that processes IP packets at the home system of the access terminal. A "foreign agent" is the infrastructure element that services the access terminal at a visited system. The access terminal is also referred to as a "mobile node". The functions of a foreign agent and/or home agent can be accomplished by a base station controller (BSC) or Packet Data Service Node in a visited network or a BSC in the home network. Authentication, authorization, and accounting functions are usually performed by a server, which is referred to as an Accounting, Authorization, and Accounting (AAA) Server. The AAA server is communicatively coupled to either a PDSN or a BSC.

FIG. 1 illustrates the connections between a plurality of wireless communication devices and various infrastructure elements of two cdma2000 systems. A plurality of access terminals $10a$-$b$ (also called remote stations, mobile stations, subscriber units, or user equipment) operate within sectors of a plurality of base station controllers $20a$-$c$, $20d$-$e$, $20f$-$h$ (also called radio network controller) of different networks $5a$, $5b$. The base station controllers $20a$-$c$, $20d$-$e$, $20f$-$h$ are supported by packet control functions (PCF) $30a$, $30b$, $30c$, respectively. Some packet control functions $30a$, $30b$ are supported by a PDSN $40a$ of one network $5a$ while the other packet control function $30c$ is supported by a PDSN $40b$ of the other network $5b$. It should be understood by one of skill in the art that there could be any number of access terminals 10, base station controllers 20, packet control functions 30 and PDSNs 40. The PDSNs 40 are coupled to an IP or private network 50, which is coupled to an AAA server 60 and/or a Home Agent 70 of the access terminals 10.

The access terminals 10 may be any of a number of different types of wireless communication device such as a portable phone, a cellular telephone that is connected to a laptop computer running IP-based Web-browser applications, a cellular telephone with associated hands-free car kits, a personal digital assistant (PDA) running IP-based Web-browser applications, a wireless communication module incorporated into a portable computer, or a fixed location communication module such as might be found in a wireless local loop or meter reading system. In the most general embodiment, access terminals may be any type of communication unit. When an access terminal is used to access communication services on behalf of user equipment, the user equipment is commonly referred to as a "tethered device."

In cdma2000 1xEV-DO, hereinafter referred to as EV-DO, the wireless communication system entities are conceptually simplified to an access terminal and an access network. An access terminal (AT) is any device that allows a user to access a packet switched data network through the EV-DO wireless access network. The access network (AN) comprises any network equipment/entity that provides data connectivity between a packet switched data network and access terminals.

A "handoff" occurs when a wireless communication device moves from the support of one base station to the support of another base station. Handoffs may be "soft," wherein the device is in communication with both base stations at the same time during the handoff process, or "hard," wherein the device ends communications with one base station before beginning communications with another base station. A handoff between one CDMA air interface system and another air interface system is referred to as a "dormant"

handoff when a data session is connected, but not active. In other words, the AT and the PDSN maintain the PPP state but do not transfer data. When the AT is actively transferring data between itself and a PDSN, then the session is referred to as an "active data session."

In CDMA 2000 IP networks, the AT may move between two or more serving PDSNs within the duration of a data session. Doing so implies a change in the PPP endpoints, i.e. the serving PDSNs, and thus, an in-session resynchronization of the PPP session is needed. Resynchronization is required because the PPP session parameters of one PDSN may differ from the PPP session parameters of another PDSN. For example, the PPP framing may differ amidst and between different PPP sessions. "Framing" refers to the formation of transmission units at the Data Link Layer underlying the IP protocol. A frame may include a header and/or a trailer, along with some number of data units. In order to optimally maintain network connectivity, PPP resynchronizations are designed to occur over the $U_m$ interface during a change in connectivity, so that the resynchronizations are transparent to the tethered device. The $U_m$ interface is the communications link between the AT and the access network.

Figure 2:
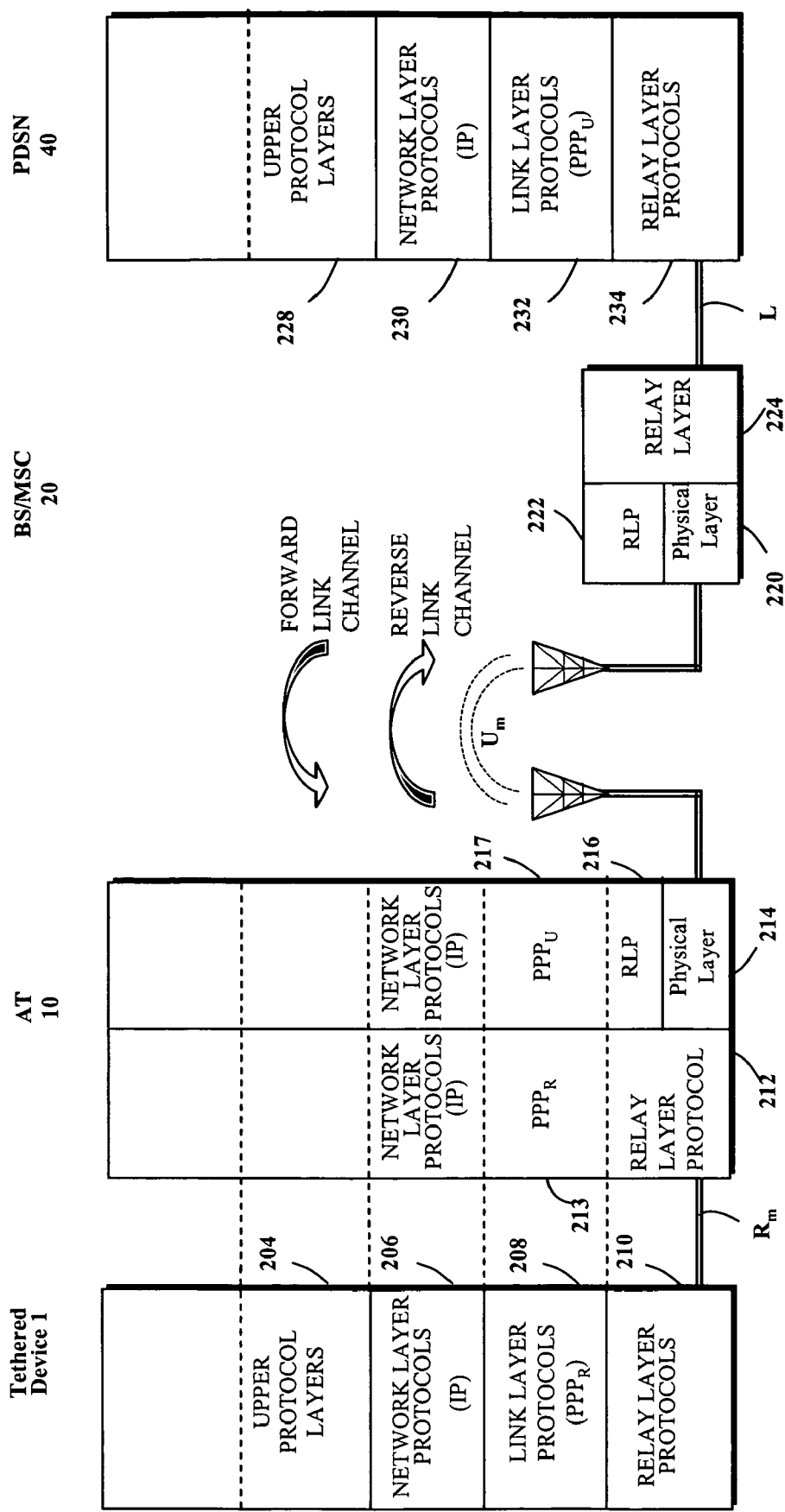

FIG. 2 describes some of the concepts of RFC 2002 laid over the entities of FIG. 1. In full-network model operation, a first PPP link is set up between the tethered device 1 and the AT 10, and a second PPP link, independent of the first, is set up between the AT 10 and the PDSN 40. This model makes the AT 10 responsible for unframing any received PPP packets and re-framing them before forwarding them to their final destination as well as providing mobility management and network address management.

The protocol stack of the tethered device 1 is illustrated as being logically connected to the AT 10 over the $R_m$ interface. The AT 10 is illustrated as being logically connected to the BS/MSC 20 protocol stack over the $U_m$ interface. The BS/MSC 20 protocol stack is, in turn, shown as being logically connected to the PDSN 40 protocol stack over the L interface.

As an illustration, the protocols depicted in FIG. 2 operate as follows: the PPP layer on the tethered device 1 associated with the $R_m$ interface (i.e., $PPP_R$ 208), encodes packets from the upper layer protocols 204, and the network layer IP protocol 206. The $PPP_R$ layer 208 then transmits the packets across the $R_m$ interface using an applicable protocol, such as, for example, the TIA/EIA 232-F protocol 210, and the packets are received by the TIA/EIA-232-F-compatible port on the AT 10. The TIA/EIA-232-F standard is defined in "INTERFACE BETWEEN DATA TERMINAL EQUIPMENT AND DATA CIRCUIT-TERMINATING EQUIPMENT EMPLOYING SERIAL BINARY DATA INTERCHANGE", published in October 1997 and herein incorporated by reference. It is to be understood that other standards or protocols known to artisans of ordinary skill in the art may be used to define the transmission across the $R_m$ interface. For example, other applicable $R_m$ interface standards include, the "UNIVERSAL SERIAL BUS (USB) SPECIFICATION, Revision 1.1", published in September 1998, and the "BLUETOOTH SPECIFICATION VERSION 1.0A CORE, published in July 1999, both incorporated by reference.

The TIA/EIA 232-F protocol 212 on the AT 10 receives the packets from the tethered device 1 and passes them to the $PPP_R$ layer 213 of the AT 10. The $PPP_R$ layer 213 unframes the packets encapsulated in the PPP frames and typically, when a data connection is up, layer 213 transfers the packets to the PPP layer associated with the $U_m$ interface (i.e., $PPP_U$ layer 217). $PPP_U$ layer 217 formats the packets in PPP frames for transmission to a $PPP_U$ peer located in the PDSN 40. The Radio Link Protocol (RLP) 216 and Physical Layer 214, both of which are well known in the art, are used to transmit the packet-encapsulated PPP frames to the BS/MSC 106 over the $U_m$ interface. The RLP protocol 216 is defined in the IS-707.2 standard, entitled "DATA SERVICE OPTIONS FOR WIDEBAND SPREAD SPECTRUM SYSTEMS: RADIO LINK PROTOCOL", published in February 1998 and the Physical Layer 214 may be defined by any of the over-the-air interfaces described previously. In a WCDMA system, the PPP layer sits on the Radio Link Control (RLC) layer, which has a similar functionality as the RLP layer.

In pseudo-network model operation, the $PPP_R$ protocol 213 transfers the packets to the $PPP_U$ protocol 217 when a data link connection is established. RFC 1661 provides that Link Control Protocol (LCP) packets must be exchanged and negotiated over each PPP link (i.e., $PPP_R$ and $PPP_U$) in order to establish, configure, and test the data link connection.

Once the LCP packets are exchanged, the link options negotiated, and the data link connection established, a network layer connection must be established between the tethered device 1 and the PDSN 40. Such a connection employs protocols 206, 212, 230, that include, for example, the IP protocol. The negotiating, configuring, enabling, and disabling of the IP protocol on both ends of the PPP links is provided by the well-known Internet Protocol Control Protocol (IPCP). IPCP is a part of a family of Network Control Protocols (NCPs) included in the PPP protocol.

According to RFC 1962, the Compression Control Protocol (CCP) is responsible for configuring, enabling, and disabling data compression algorithms on both ends of the PPP link. CCP packets may not be exchanged until the end of the Link Control Protocol (LCP) negotiations.

When a PPP resynchronization occurs on the $U_m$ interface during a PPP session which had previously negotiated a compression option, the tethered device will continue to compress outgoing packets with the previously negotiated protocol because the PPP resynchronization had been transparent to the tethered device. The tethered device will continue to compress outgoing packets with the previously negotiated protocol if the new PPP endpoint does not negotiate new CCP options after PPP resynchronization. This scenario is likely to occur in pseudo-network model operation since the PPP implementation on the tethered device commonly precludes resynchronizations. As a result, outgoing compressed IP traffic from the tethered device will be silently discarded by the PDSN and the user will experience a loss in data connectivity.

Embodiments are presented herein to address the problem stated above. The embodiments encompass: means for the AT to determine when the next change in PDSN connectivity will require an update to the tethered device's compression state; means to trigger the renegotiation of the compression state with the new PDSN even when the new PDSN does not support CCP; and means to deterministically identify PDSNs that do not support CCP and/or the tethered device's currently negotiated compression option ("compression state").

In one embodiment, the determination of a need to update the compression state of the tethered device is performed by setting a CCP update flag when a CCP C-ACK message (PPP protocol 0x80FD) is transmitted through the AT to either the PDSN or tethered device.

In order to trigger the renegotiation of CCP without renegotiating LCP and without either endpoint actually initiating the renegotiation, the AT sends a compression trigger message to the tethered device. In one embodiment, the AT inserts a CCP C-REQ message with an unsupported compression protocol option on the $R_m$ interface upon successful renegotiation of LCP on the $U_m$ interface, and resets the CCP update flag. In another embodiment, the AT inserts a CCP C-ACK message with the previously negotiated compression protocol setting on the $R_m$ interface upon successful renegotiation of LCP on the Um interface, and resets the CCP update flag. Sending the compression trigger message triggers the renegotiation of CCP between the tethered device and the new PDSN. The tethered device appears to initiate the renegotiation when the tethered device sends a CCP C-REQ message to the PDSN following the spoofed compression trigger message from the AT.

If the PDSN that receives the CCP C-REQ message does not support CCP, the PDSN will automatically send a LCP PROTOCOL-REJECT response to the tethered device to indicate the non-support of the current compression setting. This embodiment expeditiously initiates the CCP renegotiation to update the compression state of the tethered device, thereby avoiding silent data loss.

If the PDSN that receives the CCP C-REQ message does support CCP, then the PDSN will handle the received CCP C-REQ message according to the standard negotiation process. Since the PDSN supports CCP and the negotiation would occur in any case, the expense of transmitting a single CCP C-REQ message over the $R_m$ link should be balanced against the benefit of expediting the CCP negotiation, which almost always improve connection setup time. Note that the tethered device will only be updated if it had been in a previous compression state that is not supported by the new PDSN.

Figure 3:
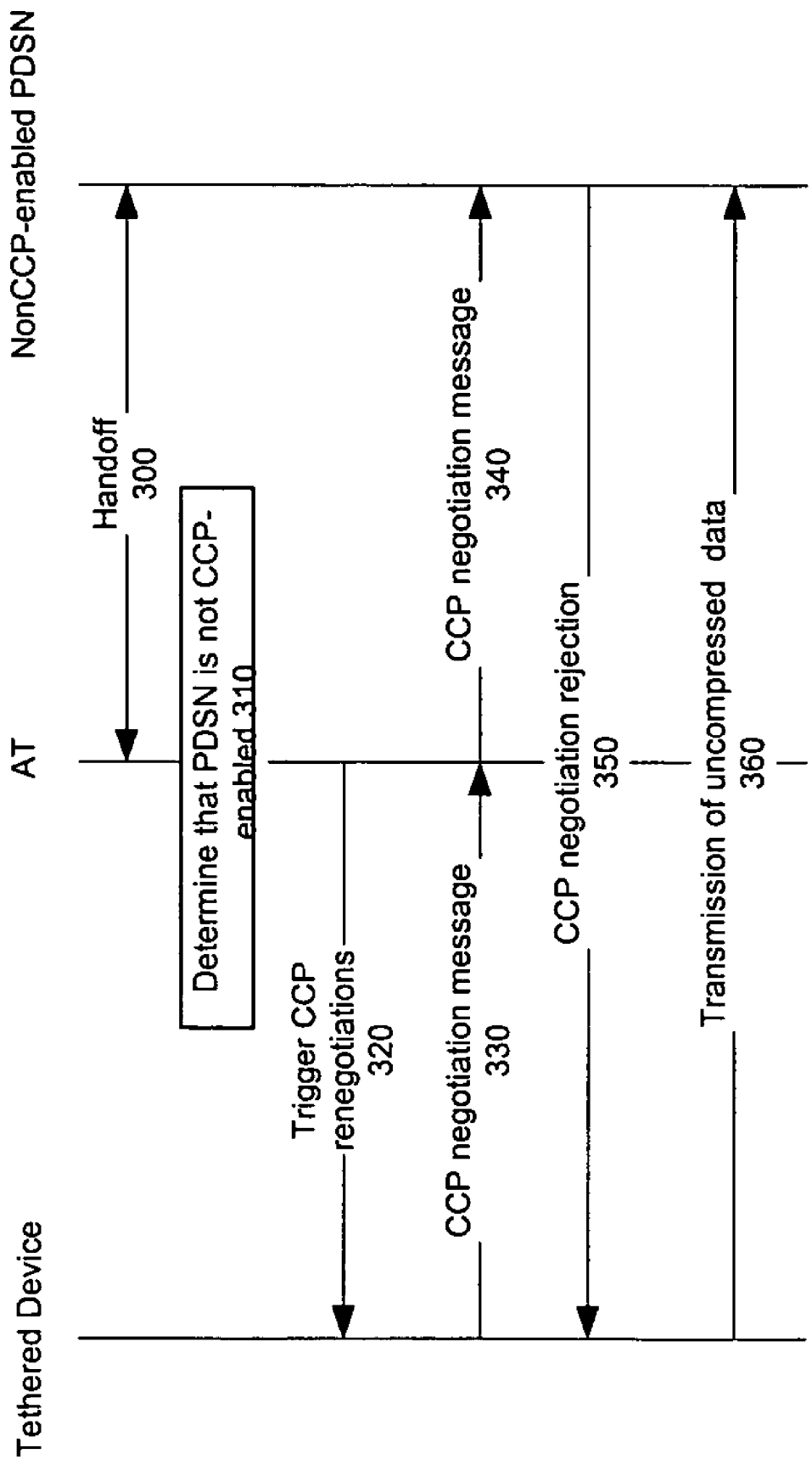

FIG. 3 illustrates an embodiment wherein the AT determines whether the new PDSN is CCP-enabled or not. At step 300, the AT has been handed off from the service of a PDSN to a non-CCP-enabled PDSN.

At step 310, the AT determines that the PDSN is non-CCP-enabled PDSN and the tethered device is in a CCP compression state.

At step 320, the AT sends a forward compression trigger (e.g., C-REQ or C-ACK) message to the tethered device, thereby triggering the tethered device to perform CCP renegotiations.

At step 330, the tethered device transmits a reverse compression request (e.g., CCP C-REQ) message to the PDSN via the AT.

At step 340, the AT relays the reverse compression request message to the PDSN.

At step 350, the non-CCP-enabled PDSN transmits a forward rejection message (e.g., PROTOCOL-REJECT message) to the tethered device, via the AT.

At step 360, the tethered device starts sending data packets that are uncompressed, rather than compressed.

The embodiments described above have been described in the context of movement between cdma2000 1xRTT networks and cdma2000 1xEV-DO networks, but it should be understood that the embodiments may also be used in the context of movement between other networks as well.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A method for enabling data connectivity for a device tethered to an access terminal when a handoff of the access terminal occurs between a first network element and a second network element, the method performed by the access terminal and comprising:

determining, by an access terminal, that a tethered device is in a communication session having a compression state negotiated with a first network element;

identifying a handoff of the communication session from the first network element to a second network element;

determining that the second network element is not enabled for the compression state;

initiating a forward compression trigger message based on determining that the second network element is not enabled for the compression state;

sending the forward compression trigger message to the tethered device;

relaying a reverse compression request message received from the tethered device, in response to the forward compression trigger message, to the second network element;

relaying a forward rejection message received from the second network element, in response to the reverse compression request message, to the tethered device, wherein the forward rejection message is operable to change the compression state of the tethered device; and receiving uncompressed data packets from the tethered device destined for the second network element, wherein the uncompressed data packets are generated by the tethered device based on the forward rejection message.

2. The method of claim 1, wherein sending the forward compression trigger message is based on successful renegotiation of a link control protocol (LCP) on the interface between the access terminal and the second network element, and wherein the forward compression trigger message comprises a compression request having a compression protocol option that is unsupported on the interface between the access terminal and the tethered device, and wherein the compression request message further comprises a reset Compression Control Protocol (CCP) flag.

3. The method of claim 1, wherein the compression state negotiates with the first network element is compliant to the Compression Control Protocol (CCP).

4. The method of claim 3, further comprising determining that the second network element is not CCP enabled.

5. The method of claim 1, wherein sending the forward compression trigger message is based on successful renegotiation of a link control protocol (LCP) on the interface between the access terminal and the second network element, and wherein the forward compression trigger message comprises a compression acknowledgement message identifying the compression state, and wherein the compression acknowledgement message further comprises a reset Compression Control Protocol (CCP) flag.

6. Apparatus in an access terminal for enabling data connectivity for a device tethered to the access terminal when a handoff of the access terminal occurs between a first network element and a second network element, the apparatus comprising:

means for determining, by an access terminal, that a tethered device is in a communication session having a compression state negotiated with a first network element;

means for identifying a handoff of the communication session from the first network element to a second network element;

means for determining that the second network element is not enabled for the compression state;

means for initiating a forward compression trigger message based on determining that the second network element is not enabled for the compression state;

means for sending the forward compression trigger message to the tethered device;

means for relaying a reverse compression request message received from the tethered device, in response to the forward compression trigger message, to the second network element;

means for relaying a forward rejection message received from the second network element, in response to the reverse compression request message, to the tethered device, wherein the forward rejection message is operable to change the compression state of the tethered device; and means for receiving uncompressed data packets from the tethered device destined for the second network element, wherein the uncompressed data packets are generated by the tethered device based on the forward rejection message.

7. Apparatus in an access terminal for enabling data connectivity for a device tethered to the access terminal when a handoff of the access terminal occurs between a first network element and a second network element, the apparatus comprising:

at least one memory element; and at least one processing element configured to execute a set of instructions stored on the at least one memory element, the set of instructions for:

determining, by an access terminal, that a tethered device is in a communication session having a compression state negotiated with a first network element;

identifying a handoff of the communication session from the first network element to a second network element;

determining that the second network element is not enabled for the compression state;

initiating a forward compression trigger message based on determining that the second network element is not enabled for the compression state;

sending the forward compression trigger message to the tethered device;

relaying a reverse compression request message received from the tethered device, in response to the forward compression trigger message, to the second network element;

relaying a forward rejection message received from the second network element, in response to the reverse compression request message, to the tethered device, wherein the forward rejection message is operable to change the compression state of the tethered device; and receiving uncompressed data packets from the tethered device destined for the second network element, wherein the uncompressed data packets are generated by the tethered device based on the forward rejection message.

8. The apparatus of claim 7, wherein the set of instructions are further operable for sending the forward compression trigger message is based on successful renegotiation of a link control protocol (LCP) on the interface between the access terminal and the second network element, and wherein the forward compression trigger message comprises a compression request message having a compression protocol option that is unsupported on the interface between the access terminal and the tethered device, and wherein the compression request message further comprises a reset Compression Control Protocol (CCP) flag.

9. The apparatus of claim 7, wherein the compression state negotiated with the first network element is compliant to the Compression Control Protocol (CCP).

10. The apparatus of claim 9, further comprising means for determining that the second network element is not CCP enabled.

11. The apparatus of claim 7, wherein the set of instructions are further operable for sending the forward compression trigger message is based on successful renegotiation of a link control protocol (LCP) on the interface between the access terminal and the second network element, and wherein the forward compression trigger message comprises a compression acknowledgement message identifying the compression state, and wherein the compression acknowledgement message further comprises a reset Compression Control Protocol (CCP) flag.

12. A processor-readable memory in an access terminal having instructions thereon, the instructions comprising:
  code for determining, by an access terminal, that a tethered device is in a communication session having a compression state negotiated with a first network element;
  code for identifying a handoff of the communication session from the first network element to a second network element;
  code for determining that the second network element is not enabled for the compression state;
  code for initiating a forward compression trigger message based on determining that the second network element is not enabled for the compression state;
  code for sending the forward compression trigger message to the tethered device;
  code for relaying a reverse compression request message received from the tethered device, in response to the forward compression trigger message, to the second network element;
  code for relaying a forward rejection message received from the second network element, in response to the reverse compression request message, to the tethered device, wherein the forward rejection message is operable to change the compression state of the tethered device; and
  receiving uncompressed data packets from the tethered device destined for the second network element, wherein the uncompressed data packets are generated by the tethered device based on the forward rejection message.

13. A method of maintaining data connectivity to a network for a device tethered to an access terminal, comprising:
  relaying compressed data packets, by an access terminal in an established communication session between a tethered device connected to the access terminal and a first network element, compressed data packets between the tethered device and the first network element, wherein the compressed data packet are compressed according to a compression state negotiated between the tethered device and the first network element for the communication session;
  identifying a handoff of the communication session from the first network element to a second network element;
  initiating a change of the compression state between the tethered device and the second network element based on identifying the handoff;
  relaying data packets between the tethered device and the second network element based on a changed compression state resulting from initiating the change of the compression state;
  wherein initiating the change of the compression state further comprises:
    sending a compression trigger message to the tethered device based on identifying the handoff;
    relaying a compression state negotiation request message, in response to the compression trigger message, from the tethered device to the second network element, wherein the compression state negotiation request message identifies the compression state negotiated between the tethered device and the first network element for the communication session;
    relaying a compression state rejection message, in response to the compression state negotiation request message, from the second network element to the tethered device, wherein the compression state rejection message indicates non-support of the compression state negotiated between the tethered device and the first network element for the communication session;
    relaying compression state renegotiation messages, in response to the compression state rejection message, between the tethered device to the second network element; and
    wherein relaying data packets between the tethered device and the second network element based on the changed compression state comprises a new compression state at the tethered device based on the compression state renegotiation messages.

14. The method of claim 13, wherein sending the compression trigger message is further based on successful renegotiation of a link control protocol (LCP) on the interface between the access terminal and the second network element, and wherein the compression trigger message comprises a compression request message having a compression protocol option that is unsupported on the interface between the access terminal and the tethered device, and wherein the compression request message further comprises a reset Compression Control Protocol (CCP) flag.

15. The method of claim 13, wherein the compression state negotiated with the first network element is compliant to the Compression Control Protocol (CCP).

16. The method of claim 15, further comprising determining that the second network element is not CCP enabled.

17. The method of claim 13, wherein sending the compression trigger message is based on successful renegotiation of a link control protocol (LCP) on the interface between the access terminal and the second network element, and wherein the compression trigger message comprises a compression acknowledgement message identifying the compression state, and wherein the compression acknowledgement message further comprises a reset Compression Control Protocol (CCP) flag.

18. A method of maintaining data connectivity to a network for a device tethered to an access terminal, comprising:
  relaying compressed data packets, by an access terminal in an established communication session between a tethered device connected to the access terminal and a first network element, compressed data packets between the tethered device and the first network element, wherein the compressed data packet are compressed according to a compression state negotiated between the tethered device and the first network element for the communication session;
  identifying a handoff of the communication session from the first network element to a second network element; and
  initiating a change of the compression state between the tethered device and the second network element based on identifying the handoff;
  relaying data packets between the tethered device and the second network element based on a changed compression state resulting from initiating the change of the compression state;
  wherein initiating the change of the compression state further comprises:
    sending a compression trigger message to the tethered device based on identifying the handoff;

relaying a compression state negotiation request message, in response to the compression trigger message, from the tethered device to the second network element;

relaying a compression rejection message, in response to the compression state negotiation request message, from the second network element to the tethered device, wherein the compression state rejection message indicates non-support of compression; and wherein relaying data packets between the tethered device and the second network element based on the changed compression state further comprises relaying uncompressed data packets according to a new uncompressed compression state at the tethered device based on the compression rejection message.

19. The method of claim 18, wherein sending the compression trigger message is based on successful renegotiation of a link control protocol (LCP) on the interface between the access terminal and the second network element, and wherein the compression trigger message comprises a compression request message having a compression protocol option that is unsupported on the interface between the access terminal and the tethered device, and wherein the compression request message further comprises a reset Compression Control Protocol (CCP) flag.

20. The method of claim 18, wherein the compression state negotiated with the first network element is compliant to the Compression Control Protocol (CCP).

21. The method of claim 20, further comprising determining that the second network element is not CCP enabled.

22. The method of claim 18, wherein sending the compression trigger message is based on successful renegotiation of a link control protocol (LCP) on the interface between the access terminal and the second network element, and wherein the compression trigger message comprises a compression acknowledgement message identifying the compression state, and wherein the compression acknowledgement message further comprises a reset Compression Control Protocol (CCP) flag.

23. Apparatus in an access terminal for maintaining data connectivity to a network for a device tethered to an access terminal, comprising:

means for relaying compressed data packets, by an access terminal in an established communication session between a tethered device connected to the access terminal and a first network element, compressed data packets between the tethered device and the first network element, wherein the compressed data packet are compressed according to a compression state negotiated between the tethered device and the first network element for the communication session;

means for identifying a handoff of the communication session from the first network element to a second network element;

means for initiating a change of the compression state between the tethered device and the second network element based on identifying the handoff; and means for relaying data packets between the tethered device and the second network element based on a changed compression state resulting from initiating the change of the compression state;

wherein the means for initiating the change of the compression state further comprises:

means for sending a compression trigger message to the tethered device based on identifying the handoff;

means for relaying a compression state negotiation request message, in response to the compression trigger message, from the tethered device to the second network element, wherein the compression state negotiation request message identifies the compression state negotiated between the tethered device and the first network element for the communication session;

means for relaying a compression state rejection message, in response to the compression state negotiation request message, from the second network element to the tethered device, wherein the compression state rejection message indicates non-support of the compression state negotiated between the tethered device and the first network element for the communication session;

means for relaying compression state renegotiation messages, in response to the compression state rejection message, between the tethered device to the second network element; and wherein relaying data packets between the tethered device and the second network element based on the changed compression state comprises a new compression state at the tethered device based on the compression state renegotiation messages.

24. Apparatus in an access terminal for maintaining data connectivity to a network for a device tethered to an access terminal, comprising:

at least one memory element; and at least one processing element configured to execute a set of instructions stored on the at least one memory element, the set of instructions for:

relaying compressed data packets, by an access terminal in an established communication session between a tethered device connected to the access terminal and a first network element, compressed data packets between the tethered device and the first network element, wherein the compressed data packet are compressed according to a compression state negotiated between the tethered device and the first network element for the communication session;

identifying a handoff of the communication session from the first network element to a second network element;

initiating a change of the compression state between the tethered device and the second network element based on identifying the handoff; and relaying data packets between the tethered device and the second network element based on a changed compression state resulting from initiating the change of the compression state;

wherein initiating the change of the compression state further comprises:

sending a compression trigger message to the tethered device based on identifying the handoff;

relaying a compression state negotiation request message, in response to the compression trigger message, from the tethered device to the second network element, wherein the compression state negotiation request message identifies the compression state negotiated between the tethered device and the first network element for the communication session;

relaying a compression state rejection message, in response to the compression state negotiation request message, from the second network element to the tethered device, wherein the compression State rejection message indicates non-support of the compression state negotiated between the tethered device and the first network element for the communication session;

relaying compression state renegotiation messages, in response to the compression state rejection message, between the tethered device to the second network element; and wherein relaying data packets between the tethered device and the second network element based on the changed compression state comprises a new compression state at the tethered device based on the compression state renegotiation messages.

25. The apparatus of claim 24, wherein the set of instructions are further operable for sending the compression trigger message is further based on successful renegotiation of a link control protocol (LCP) on the interface between the access terminal and the second network element, and wherein the compression trigger message comprises a compression request message having a compression protocol option that is unsupported on the interface between the access terminal and the tethered device, and wherein the compression request message further comprises a reset Compression Control Protocol (CCP) flag.

26. The apparatus of claim 24, wherein the compression state negotiated with the first network element is compliant to the Compression Control Protocol (CCP).

27. The apparatus of claim 26, further comprising means for determining that the second network element is not CCP enabled.

28. The apparatus of claim 24, wherein the set of instructions are further operable for sending the compression trigger message is based on successful renegotiation of a link control protocol (LCP) on the interface between the access terminal and the second network element, and wherein the compression trigger message comprises a compression acknowledgement message identifying the compression state, and wherein the compression acknowledgement message further comprises a reset Compression Control Protocol (CCP) flag.

29. A processor-readable memory in an access terminal having instructions thereon, the instructions comprising:
    code for relaying compressed data packets, by an access terminal in an established communication session between a tethered device connected to the access terminal and a first network element, compressed data packets between the tethered device and the first network element, wherein the compressed data packet are compressed according to a compression state negotiated between the tethered device and the first network element for the communication session;
    code for identifying a handoff of the communication session from the first network element to a second network element;
    code for initiating a change of the compression state between the tethered device and the second network element based on identifying the handoff; and
    code for relaying data packets between the tethered device and the second network element based on a changed compression state resulting from initiating the change of the compression state;
    wherein the code for initiating the change of the compression state further comprises:
        code for sending a compression trigger message to the tethered device based on identifying the handoff;
        code for relaying a compression state negotiation request message, in response to the compression trigger message, from the tethered device to the second network element, wherein the compression state negotiation request message identifies the compression state negotiated between the tethered device and the first network element for the communication session;
        code for relaying a compression state rejection message, in response to the compression state negotiation request message, from the second network element to the tethered device, wherein the compression state rejection message indicates non-support of the compression state negotiated between the tethered device and the first network element for the communication session;
        code for relaying compression state renegotiation messages, in response to the compression state rejection message, between the tethered device to the second network element; and
    wherein relaying data packets between the tethered device and the second network element based on the changed compression state comprises a new compression state at the tethered device based on the compression state renegotiation messages.

30. Apparatus in an access terminal for maintaining data connectivity to a network for a device tethered to an access terminal, comprising:
    means for relaying compressed data packets, by an access terminal in an established communication session between a tethered device connected to the access terminal and a first network element, compressed data packets between the tethered device and the first network element, wherein the compressed data packet are compressed according to a compression state negotiated between the tethered device and the first network element for the communication session;
    means for identifying a handoff of the communication session from the first network element to a second network element;
    means for initiating a change of the compression state between the tethered device and the second network element based on identifying the handoff; and
    means for relaying data packets between the tethered device and the second network element based on a changed compression state resulting from initiating the change of the compression state;
    wherein the means for initiating the change of the compression state further comprises:
    means for sending a compression trigger message to the tethered device based on identifying the handoff;
    means for relaying a compression state negotiation request message, in response to the compression trigger message, from the tethered device to the second network element;
    means for relaying a compression rejection message, in response to the compression state negotiation request message, from the second network element to the tethered device, wherein the compression state rejection message indicates non-support of compression; and
    wherein the means for relaying data packets between the tethered device and the second network element based on the changed compression state further comprises relaying uncompressed data packets according to a new uncompressed compression state at the tethered device based on the compression rejection message.

31. Apparatus in an access terminal for maintaining data connectivity to a network for a device tethered to an access terminal, comprising:
    at least one memory element; and at least one processing element configured to execute a set of instructions stored on the at least one memory element, the set of instructions for:
  relaying compressed data packets, by an access terminal in an established communication session between a tethered device connected to the access terminal and a first network element, compressed data packets between the tethered device and the first network element, wherein the compressed data packet are compressed according to a compression state negotiated between the tethered device and the first network element for the communication session;
  identifying a handoff of the communication session from the first network element to a second network element;
  initiating a change of the compression state between the tethered device and the second network element based on identifying the handoff;
  relaying data packets between the tethered device and the second network element based on a changed compression state resulting from initiating the change of the compression state;
wherein initiating the change of the compression state further comprises:
  sending a compression trigger message to the tethered device based on identifying the handoff;
  relaying a compression state negotiation request message, in response to the compression trigger message, from the tethered device to the second network element;
  relaying a compression rejection message, in response to the compression state negotiation request message, from the second network element to the tethered device, wherein the compression state rejection message indicates non-support of compression; and
wherein relaying data packets between the tethered device and the second network element based on the changed compression state further comprises relaying uncompressed data packets according to a new uncompressed compression state at the tethered device based on the compression rejection message.

32. The apparatus of claim 31, wherein the set of instructions are further operable for sending the compression trigger message is based on successful renegotiation of a link control protocol (LCP) on the interface between the access terminal and the second network element, and wherein the compression trigger message comprises a compression request message having a compression protocol option that is unsupported on the interface between the access terminal and the tethered device, and wherein the compression request message further comprises a reset Compression Control Protocol (CCP) flag.

33. The apparatus of claim 31, wherein the compression state negotiated with the first network element is compliant to the Compression Control Protocol (CCP).

34. The apparatus of claim 33, further comprising means for determining that the second network element is not CCP enabled.

35. The apparatus of claim 31, wherein the set of instructions are further operable for sending the compression trigger message is based on successful renegotiation of a link control protocol (LCP) on the interface between the access terminal and the second network element, and wherein the compression trigger message comprises a compression acknowledgement message identifying the compression state, and wherein the compression acknowledgement message further comprises a reset Compression Control Protocol (CCP) flag.

36. A processor-readable memory in an access terminal having instructions thereon, the instructions comprising:
  code for relaying compressed data packets, by an access terminal in an established communication session between a tethered device connected to the access terminal and a first network element, compressed data packets between the tethered device and the first network element, wherein the compressed data packet are compressed according to a compression state negotiated between the tethered device and the first network element for the communication session;
  code for identifying a handoff of the communication session from the first network element to a second network element;
  code for initiating a change of the compression state between the tethered device and the second network element based on identifying the handoff; and
  code for relaying data packets between the tethered device and the second network element based on a changed compression state resulting from initiating the change of the compression state;
wherein the code for initiating the change of the compression state further comprises:
  code for sending a compression trigger message to the tethered device based on identifying the handoff;
  code for relaying a compression state negotiation request message, in response to the compression trigger message, from the tethered device to the second network element;
  code for relaying a compression rejection message, in response to the compression state negotiation request message, from the second network element to the tethered device, wherein the compression state rejection message indicates non-support of compression; and
wherein the code for relaying data packets between the tethered device and the second network element based on the changed compression state further comprises relaying uncompressed data packets according to a new uncompressed compression state at the tethered device based on the compression rejection message.

* * * * *